United States Patent [19]

Hedberg, Jr.

[11] 4,221,666

[45] Sep. 9, 1980

[54] FILTRATION APPARATUS

[75] Inventor: Henry C. Hedberg, Jr., Gonzales, La.

[73] Assignee: Ormet Corporation, Burnside, La.

[21] Appl. No.: 21,697

[22] Filed: Mar. 19, 1979

[51] Int. Cl.³ .............................................. B01D 25/28
[52] U.S. Cl. ..................................... 210/236; 210/332
[58] Field of Search ............... 210/236, 235, 232, 225, 210/230, 224, 322, 332

[56] References Cited

U.S. PATENT DOCUMENTS

| | | | |
|---|---|---|---|
| 2,765,083 | 10/1956 | Pumory | 210/236 |
| 2,916,143 | 12/1959 | McConglogre | 210/236 |
| 2,921,685 | 1/1960 | Johnson et al. | 210/236 |
| 3,043,434 | 7/1962 | Strom et al. | 210/236 |
| 3,252,577 | 5/1966 | Anderson | 210/236 |
| 3,310,171 | 3/1967 | Schmidt, Jr. | 210/236 |
| 3,344,922 | 10/1967 | Kracklauer | 210/236 |
| 4,076,033 | 2/1978 | Busse et al. | 210/225 |
| 4,107,042 | 8/1978 | Heinrich | 210/225 |

FOREIGN PATENT DOCUMENTS

| | | | |
|---|---|---|---|
| 249994 | 4/1911 | Fed. Rep. of Germany | 210/236 |
| 411581 | 2/1945 | Italy | 210/236 |
| 276820 | 9/1927 | United Kingdom | 210/236 |

*Primary Examiner*—Theodore A. Granger
*Attorney, Agent, or Firm*—Bachman and LaPointe

[57] ABSTRACT

An apparatus for removing residue deposits on filtration elements is disclosed which significantly reduces the time necessary for cleaning the filters. This apparatus utilizes an improved arrangement of spray nozzles so as to effectively clean the filter leaf assemblies and the housing which encloses the filter leaves. The apparatus can incorporate semiautomatic and automatic control mechanisms to reduce or eliminate human error in the cleaning of the filters. The apparatus increases production time in the filtering process and thus increases the capacity of the filters.

11 Claims, 1 Drawing Figure

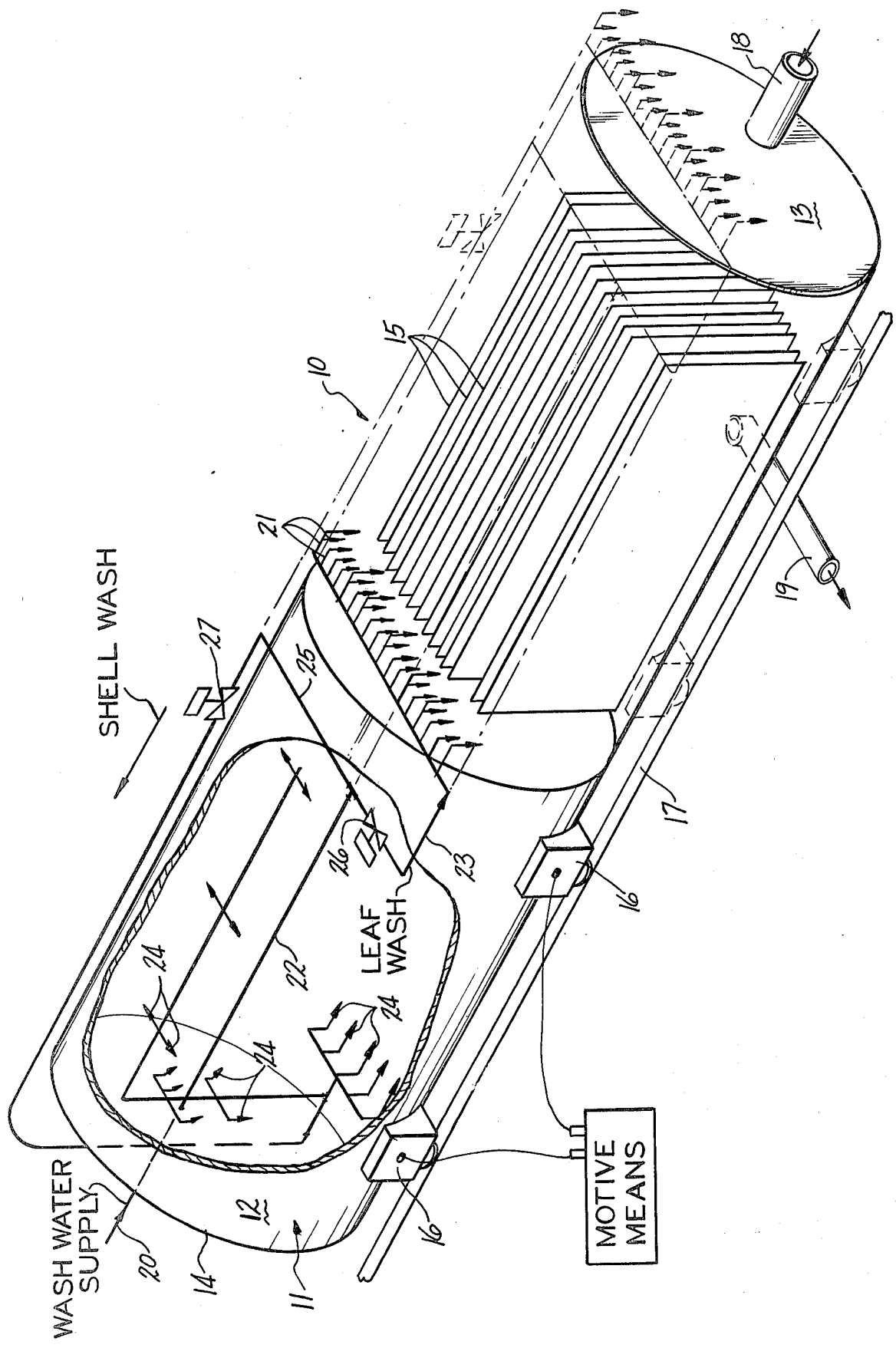

FILTRATION APPARATUS

BACKGROUND OF THE INVENTION

Various processes have been devised to produce alumina from bauxite for eventual reduction into aluminum. The process which has been most widely utilized by conversion facilities has been the Bayer process for the production of alumina. One way of maintaining product quality in the Bayer process is to utilize what are known as Kelly type pressure filters in the alumina extraction process. In particular, these filters provide a means of removing the insoluble bauxite residues ("red mud") from the desirable alumina bearing liquor in the process stream by direct pressure filtration. In particular, the bauxite ore is reacted continuously with a caustic soda stream to extract hydrated alumina in digester pressure vessels. This process step dissolves the hydrated alumina to enable the alumina to be separated from the insoluble residues and be drawn off in a process liquor for precipitation of alumina trihydrate particles. The Kelly type pressure filters incorporate leaf type filter elements in a pressure vessel which remove the red mud particles without causing an interruption in process flow which would reduce production of liquor containing dissolved hydrated alumina. After alumina trihydrate particles are precipitated from this process, rotary kilns are used to convert this precipitate to aluminum oxide, which is the final product of the conversion plants. This aluminum oxide is utilized by aluminum producers as the basic material for reduction into pure aluminum.

In a process utilizing a Kelly type pressure filter arrangement, the red mud residues form a cake on cloth covered leaf frames as the clarified liquor containing the dissolved alumina passes through the system. Since this mud cake builds up on the filter cloths, the filtration rate decreases down to a certain point at which the filter assembly must be drained and the cloth filters must be washed with dilute process liquor. After this point in the process, the filter assembly must be cleaned of red mud residue before the filtration cycle can be repeated. Most prior art practices have utilized personnel equipped with high pressure water hoses to wash the caked red mud off of the filter leaves and out of the filter shell assembly. This particular method has resulted in considerable downtime in the production process and consequent difficult working conditions for the personnel involved. Such items as physical exertion, exposure to heat and process liquor splashes and poor visibility due to the vapors generated by the cleaning have severely detracted from the performance of the process personnel. Generally, the downtime required for the cleaning operations has been approximately 20 to 30 minutes for each filter assembly. Various difficulties have been encountered with manual cleaning which result in certain parts of the filter assembly not always being hosed clean. Mud deposits which have been overlooked have quickly formed hard scale deposits and buildup which have resulted in high maintenance costs and low productivity of the equipment. Filter cloths have had to be replaced at a fairly high rate utilizing such a cleaning process in order to maintain an adequate flow throughout the process.

It is a principal object of the present invention to provide an apparatus for removing residue deposits on pressure filters which significantly reduces the time necessary for cleaning the filters.

It is an additional principal object of the present invention to provide an apparatus as aforesaid which enables such improved cleaning of deposit residue filters to be performed with greatly improved efficiency.

It is a further object of the present invention to provide an apparatus as aforesaid which can utilize semiautomatic and automatic control mechanisms to reduce or eliminate human error in the cleaning of deposit residue filters.

It is an additional object of the present invention to provide an apparatus as aforesaid which increases productive time in the filter process and thus increases capacity of the process.

Further objects and advantages of the present invention will become more apparent from a consideration of the following specification.

SUMMARY OF THE INVENTION

In accordance with the apparatus of the present invention, it has now been found that the foregoing objects and advantages can be readily obtained. The apparatus of the present invention comprises: a body shell for receiving a supply of liquid under pressure; an array of generally rectangular, planar filter elements arranged upright within said shell and substantially parallel to the axis of the body shell and to each other; means for moving one of said shell or filter elements away from and towards the other of said shell or filter elements so that there is relative lateral movement between said shell and said filter elements; means for introducing liquor to be filtered into said shell and means for removing filtrate from the shell; inlet means for introducing wash liquid under pressure into said shell and outlet means for removing wash liquid from the shell; and a plurality of spray nozzles operatively connected to said inlet means and positioned over said filter elements, whereby said nozzles and filter elements move with respect to each other during said relative lateral movement and said nozzles clean said elements during said relative lateral movement. In a preferred embodiment the apparatus of the present invention comprises: a movable body shell for receiving a supply of liquid under pressure; an array of generally rectangular, stationary planar filter elements arranged upright within said shell and substantially parallel to the axis of the body shell and to each other; means for moving at least a portion of said shell away from and towards said elements; means for introducing liquor to be filtered into said shell and means for removing filtrate from the shell; inlet means for introducing wash liquid under pressure into said shell and outlet means for removing wash liquid from the shell; and a plurality of movable spray nozzles operatively connected to said inlet means and movable with said movable shell and positioned over said filter elements, whereby said nozzles pass over and clean said elements as said shell is moved relative thereto.

In accordance with a preferred embodiment a plurality of second spray nozzles are provided operatively connected to the inlet means and internally positioned adjacent the shell for cleaning the shell. Desirably, one may provide valve means operatively connected to the movable nozzles and the second nozzles for sequentially directing wash liquor first towards the shell and second towards the filter elements.

The spray nozzle arrangements of the present invention are conveniently operated by pneumatic controls.

These spray nozzle arrangements enable the filter leaves and the filter shell assembly to be completely cleaned of insoluble bauxite residues in the alumina production process. Each spray washing arrangement may be independently activated and deactivated by the movement of the filter shell or filter elements as they retract and close. The retraction mechanism speed of the shell or filter elements may be synchronized to provide optimum opening and closing speed of the filter assembly to obtain the most effective spray cleaning. Caked red mud residues are quickly removed from the filter leaves and washed away from the shell assembly. The dumping time of the process is therefore greatly reduced.

BRIEF DESCRIPTION OF THE DRAWING

The present invention may be more readily understood from a consideration of the accompanying drawing which is an overall view of the filter assembly, showing a typical arrangement of wash water piping and spray nozzles for cleaning the assembly according to the present invention. The leaf wash spray nozzle arrangement is located externally at the open end of the shell assembly. In the cutaway portion of the shell the internal shell wash spray nozzle arrangement is exposed. The filter assembly is shown in the open position, with the closed position shown in phantom.

DETAILED DESCRIPTION

The present invention utilizes a particular arrangement of spray nozzles and patterns to completely clean the filter leaves and shell assembly utilized in the pressure filtration step of an alumina production process, although in its broad scope the apparatus may be conveniently used in any filtration apparatus. Since a large volume of high pressure water is supplied to the spray nozzles, pump size, pipe size and nozzle size and patterns must all be selected to provide both effective and judicious distribution of water to completely clean all internal parts of the filter assembly. The present invention is particularly adaptable to automatic controls to activate and deactivate the cleaning process in conjunction with the opening and closing of the filter shell. One significant advantage brought about by the present invention is that labor requirements for cleaning of the shell and filter leaves are reduced by 60%. Some personnel should be retained to insure that the spray nozzles are not plugged and are properly directed and in order to check on the cleanliness of the shell and filter leaf assemblies when the automatic cleaning step has been performed.

With the improved cleaning apparatus of the present invention, filter downtime is generally reduced to approximately 5 or 6 minutes utilizing the automatic dumping procedure. Approximately 10 minutes are required for the inspection and cleanup dumping procedure, thus reducing the entire dumping time by 75%. Production filter time in the alumina production process is increased by 10%. Improved washing of the caked mud from the cloth filters increases the serviceable life of the filter cloth by 10 to 20%.

As a safeguard against operational and mechanical problems within the cleaning system of the present invention, versatility may be provided within the system to guard against malfunction or failure. Each filter can be dumped remotely from the floor level of the equipment or semiautomatically by operation of the spray systems from the control platform or by manual hosing of the filter leaves, as will be seen from the ensuing discussion. The drawing illustrates the overall apparatus piping and spray nozzle arrangement involved in utilizing the cleaning system of the present invention.

As indicated hereinabove, the present invention broadly contemplates relative lateral movement between the filter elements and shell, although in the preferred embodiment the filter elements are stationary and at least a portion of the shell moves laterally. When the shell moves laterally the first or filter element nozzles should be connected to the forward portion of the shell so that they pass over the filter elements during lateral movement of the shell. If the filter elements move, the first nozzles should be connected to the rear of the shell so that the filter elements pass under the nozzles during lateral movement of the filter elements.

Thus, in a preferred embodiment as shown in the drawing, the filtration apparatus 10 includes a movable body shell 11 having a generally cylindrical body portion 12 and forward end plate 13 and rearward end plate 14. In its closed position, shown in phantom in the drawing, a closed generally cylindrical filtration apparatus is provided. In its open position, shown in solid lines in the drawing, there are exposed an array of generally rectangular stationary filter elements 15 arranged upright within the shell 11 when said shell is closed. The filter elements 15 are substantially parallel to the axis of the shell and to each other. In the embodiment shown in the drawing the entire body shell 11 is movable except the forward end plate 13. One may naturally provide that less than the entire body portion is movable, as for example it may be convenient to allow that portion of the body 12 beneath the filter elements to remain stationary so the entire shell 11 is sealingly engaged when in the closed position.

The body shell 11 is mounted on wheels 16 which travel on rails 17. Any convenient motive means may be used to move the body shell 11 away from and towards the filter elements 15, such as that shown schematically in the drawing. Desirably, the motive means are coordinated with the washing assembly, which will be described hereinafter, so to automatically actuate same upon initiation of movement of the shell 11 and to discontinue washing upon cessation of movement.

The filtration apparatus also includes desirably located means for introducing liquor to be filtered into the shell, such as liquor inlet pipe 18 located on end plate 13, and also desirably located means for removing filtrate from the filter elements 15, such filtrate outlet pipe 19 located beneath filter elements 15. If desired, branches may be provided on the inlet pipe 18 to allow introduction of dilute process liquor therein, and branches may also be provided on outlet pipe 19 for separate draining of filtrate and wash liquid.

Inlet means or pipe 20 is provided for introducing wash liquid under pressure into shell 11. As indicated hereinabove, the wash liquid may be removed via outlet pipe 19, or a separate wash liquid outlet or outlets may be provided for removal of the wash liquid. Naturally, the base portions should be appropriately contoured to direct outlet liquid towards appropriate exits.

A plurality of movable spray nozzles 21 are provided operatively connected to inlet means 20 via main line 22 and filter element wash line 23. Nozzles 21 are located outside shell 11 and forward thereof and are positioned over the filter elements 15. In addition, nozzles 21 are connected to movable shell 11, as by main line 22, so that said nozzles are movable therewith and pass over and clean the filter elements as the shell is moved relative thereto.

Preferably, a plurality of second spray nozzles 24 are provided operatively connected to said inlet means 20 via branch line 25 branching off main line 22. The second spray nozzles are positioned adjacent the shell 11 for cleaning said shell. Valve means 26 and 27 may be provided on filter element wash line 23 and branch line 25, respectively, for sequentially activating wash liquid first to clean the shell 11 and second to clean the filter elements 15, if desired. In an alternate embodiment, however, the filter elements and shell are cleaned simultaneously.

Pneumatic controls are desirably utilized to provide the pressurized water to the spray nozzles at the start of the spray cleaning step in the operation. This cleaning operation is utilized in conjunction with the opening and closing of the shell assembly to provide the automatic feature of the present invention. In a specific illustration of the apparatus of the present invention, after the filtration and filter cake wash step of the alumina process, in order to activate the apparatus an operator may disengage a filter head locking mechanism with hydraulic rams to release the filter shell for retraction. A pneumatic control lever on the floor may then be moved to activate the shell retraction mechanism. As the shell retracts, the filter leaf and filter shell sprays may be activated by various pneumatic controls. When the shell reaches its full open position, the retracting mechanism may be automatically reset to close the shell assembly. The shell then moves forward to the closed position and immediately before it reaches the head locking position, the spray system deactivates. The operator then locks the shell closed and places the filter assembly back into service.

Conventional pneumatic controls may naturally be provided to operate the water wash piping shown in the drawing. Naturally, the apparatus of the present invention may be operated manually, or partly manually or partly automatically.

The drawing illustrates the specific spray nozzle arrangement which has been found to be particularly advantageous; although, of course, many alternative patterns may be readily devised. Also, a variety of different nozzles may be provided for particular locations depending upon particular requirements. In a specific embodiment of the bottom spray pattern utilized in the present invention, the spray nozzles may be of the 0° solid stream type and may be spaced on 7" centers located approximately 1.5 to 2" above the bottom of the shell surface. The outlet stream from the spray nozzles should be as nearly parallel with the shell surface as possible and proper alignment of the spray nozzles is important. The nozzles should be fanned out at slight angles from the centerline of the shell assembly so that the spacing between the cleaning streams at the exit of the shell assembly is approximately 10". This provides for effective cleaning of the bottom surface as the deposited material is forced along by the spray from the nozzles.

A particular spray arrangement is also desirable to clean the walls of the shell assembly. Such an arrangement is illustrated in the drawing, wherein numerous nozzles are located at the top of the shell assembly and each nozzle provides a fan spray of approximately 80°. The nozzles are spaced so that the fan sprays from each nozzle overlap each other and also overlap the end wall and opening of the shell assembly. The nozzles should be sized to the spray angle and spray volume required to provide necessary coverage to control mud deposit accumulation on the shell walls and behind the rails within the shell assembly. These spray nozzles may be set to provide a spray angle to hit the shell wall where the filter leaves are closest to the wall. The flow of washing liquid then follows the shell assembly curvature and washes behind the inside rails supporting the filter leaf carriage assembly.

A variety of other different nozzles may be provided for particular requirements.

The system of the present invention has functioned on cakes deposited by pressure filtration up to 75 pounds per square inch (psi) on woven filter media. The cake deposited in these instances has consisted of bauxite mud residue and a mixture of such residue with slaked lime filter aid material. Deposits with similar physical characteristics could also be handled by the cleaning arrangement of the present invention. Additionally, the spray patterns and sizes can be fitted to meet the specific application. Generally, spray nozzles used are rated at 20 gallons per minute at 40 psi with the exception of the bottom shell wash nozzles which are rated at 35 gallons per minute at 40 psi. It should be noted that water pressure at the spray nozzles is effectively mainly above 75 psi. Naturally, cleaning performance improves as the pressure exerted by the nozzle streams increases. The most effective working range of the water pressure in the present invention is 85 to 200 psi. The pumping system utilized in the cleaning assembly of the present invention must be adequate to supply the particular prescribed pressure requirements. This pumping system must also supply relatively large water volume requirements since a nozzle water pressure of 145 to 150 psi for the leaf wash operating alone utilizes about 800 gallons per minute (gpm). A nozzle pressure of 160 to 170 psi for the shell wash operating alone utilizes about 800 gallons per minute. A nozzle pressure of 85 to 95 psi utilizing both washes simultaneously will generally utilize over 1200 gallons per minute. Naturally, there are certain advantages in reduced water volume requirements and increased nozzle pressure that exist when operating each wash sequentially. Strainer assemblies should be utilized to make sure that the water supply is free of any material which could plug the spray nozzles.

The invention may more readily be understood from a consideration of the following illustrative example.

EXAMPLE

The filter cleaning assembly of the present invention was compared to a manual cleaning operation in a Kelly type pressure filter assembly in a Bayer process plant for the production of alumina. The Kelly filter consisted of a retractable shell pressure filter having a diameter of 7.5'. This filter assembly had a volume capacity of 5,577 gallons and was equipped with 14 filter leaves with a total filter area of 2,000 square feet. A normal bauxite filtering operation was performed in this filter assembly and the time necessary for filtration, cake washing and dumping time (filter cleaning time) was measured. In both instances, the actual filtration time and the cake washing time were 162 minutes and 27 minutes, respectively. The dumping or cleaning time necessary in the manual operation was 27 minutes for a total production time of 216 minutes. Of this production time, the actual percentage productive time was 162 minutes divided by 216 minutes or approximately 75% productive time. In the Bayer process utilizing the filter washing assembly of the present invention, the cleaning time was only 6 minutes, for a total production time of 195 minutes. Of this particular production time, the actual percentage productive time was 162 minutes divided by 195 minutes or approximately 83% productive time. The increase in productive time brought about by the instant invention was then determined by subtracting 75 from 83, dividing this result by 75 and multiplying by 100 to come up with approximately a 10.7% increase in productive time. This increase directly translates into an increase of capacity for the system without the need to purchase any additional production machinery.

As can clearly be seen by the example presented above, the cleaning process and apparatus of the present invention provides an increase in production without the need for purchasing any additional production equipment. The only capital expenditures which must be made are those necessary for the purchase of pumps and nozzle assemblies to accomplish the cleaning operation. These expenditures are quickly regained through a combination of the increase in production and the decrease in personnel time needed in the particular filtering process. While the example has been particularly directed to a new system of cleaning filter leaf assemblies in the Bayer process for the production of alumina, it can clearly be seen that the present invention can be applied to any process which requires filtration in its production steps. Of course, such processes should be those which are limited to filtration of material in a liquid system since the cleaning process and apparatus of the present invention utilizes a cleaning liquid to remove deposits from the filter media. As indicated above, the particular processes can be adapted to the present invention by varying spray operating sequences with control signals to valve actuators, spray sizes and spray patterns. Such a combination of variables will determine the most effective cleaning procedure for the filters involved in the processes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A filtration apparatus comprising:
    a body shell for receiving a supply of liquid under pressure;
    an array of generally rectangular, planar filter elements arranged upright within said shell and substantially parallel to the axis of the body shell and to each other;
    means for moving one of said shell or filter elements away from and towards the other of said shell or filter elements so that there is relative lateral movement between said shell and said filter elements;
    means for introducing liquor to be filtered into said shell and means for removing filtrate from the shell;
    inlet means for introducing wash liquid under pressure into said shell and outlet means for removing wash liquid from the shell; and
    a plurality of spray nozzles operatively connected to said inlet means and positioned over said filter elements, wherein said nozzles and filter elements move with respect to each other by means of said relative lateral movement and said nozzles clean said elements during said relative lateral movement and wherein said nozzles are activated upon initiation of said relative lateral movement and are deactivated upon cessation of said movement.

2. A filtration apparatus according to claim 1 wherein said spray nozzles are fixed and move relative said filter elements by means of said relative lateral movement.

3. A filtration apparatus according to claim 1 including a plurality of second spray nozzles operatively connected to said inlet means and positioned adjacent said shell for cleaning said shell.

4. A filtration apparatus comprising:
    a movable body shell for receiving a supply of liquid under pressure;
    an array of generally rectangular, stationary planar filter elements arranged upright within said shell and substantially parallel to the axis of the body shell and to each other;
    means for moving at least a portion of said shell away from and towards said elements;
    means for introducing liquor to be filtered into said shell and means for removing filtrate from the shell;
    inlet means for introducing wash liquid under pressure into said shell and outlet means for removing wash liquid from the shell; and
    a plurality of spray nozzles positioned over said filter elements and fixed in the forward portion of said shell, said nozzles operatively connected to said inlet means and movable with said movable shell, wherein said nozzles pass over and clean said elements as said shell is moved relative thereto and wherein said nozzles are activated upon initiation of said movement and are deactivated upon cessation of said movement.

5. A filtration apparatus according to claim 4 including a plurality of second spray nozzles operatively connected to said inlet means and positioned adjacent said shell for cleaning said shell.

6. A filtration apparatus according to claim 5 including valve means operatively connected to said movable nozzles and to said second nozzles operative to sequentially direct wash liquid first towards said shell and second towards said filter elements.

7. A filtration apparatus according to claim 5 wherein all of said nozzles are activated upon initiation of movement of said shell and are deactivated upon cessation of movement of the shell.

8. A filtration apparatus according to claim 4 wherein said shell is generally cylindrical.

9. A filtration apparatus according to claim 4 wherein said apparatus is a Kelly type pressure filter in a Bayer process for the production of alumina.

10. A filtration apparatus according to claim 4 using a water pressure at the spray nozzles of at least 75 psi.

11. A filtration apparatus according to claim 10 using a water pressure of 85–200 psi.

* * * * *